(12) United States Patent
Bobash

(10) Patent No.: US 6,388,852 B1
(45) Date of Patent: May 14, 2002

(54) FLICKER PROTECTION CIRCUIT

(76) Inventor: Gerry Bobash, 1750 W. Boston St. #1055, Chandler, AZ (US) 85224

( * ) Notice: Subject to any disclaimer, the term of this patent is extended or adjusted under 35 U.S.C. 154(b) by 0 days.

(21) Appl. No.: 09/498,678

(22) Filed: Feb. 7, 2000

Related U.S. Application Data
(60) Provisional application No. 60/120,398, filed on Feb. 17, 1999.

(51) Int. Cl.[7] .................................................. H02H 3/00
(52) U.S. Cl. ............................ 361/74; 361/75; 361/111
(58) Field of Search .............................. 361/78, 85, 86, 361/111, 90, 92, 18, 59, 71, 74–75

(56) References Cited

U.S. PATENT DOCUMENTS

| | | | |
|---|---|---|---|
| 4,259,705 A | | 3/1981 | Stifter .......................... 361/56 |
| 4,394,702 A | * | 7/1983 | Boothe ......................... 361/92 |
| 4,584,622 A | | 4/1986 | Crosby et al. ................ 361/56 |
| 4,587,588 A | | 5/1986 | Goldstein ..................... 361/54 |
| 4,630,163 A | | 12/1986 | Cooper et al. ................ 361/56 |
| 4,694,194 A | | 9/1987 | Hansel et al. ................. 307/66 |
| 4,728,808 A | | 3/1988 | Bet-Esh et al. ............... 307/66 |
| 4,771,356 A | * | 9/1988 | Hastings ....................... 361/59 |
| 4,876,713 A | | 10/1989 | Crosby et al. ............... 379/412 |
| 4,999,730 A | * | 3/1991 | Pickard ......................... 361/59 |
| 5,016,133 A | * | 5/1991 | Noguchi et al. .............. 361/92 |
| 5,224,010 A | * | 6/1993 | Tran et al. .................... 361/90 |
| 5,384,792 A | | 1/1995 | Hirachi ......................... 371/66 |
| 5,555,483 A | * | 9/1996 | Pressman et al. ............. 361/90 |

* cited by examiner

*Primary Examiner*—Kim Huynh

(57) ABSTRACT

A power line flicker protection circuit, used to protect electronic equipment, features the following: A transformer (T1), provides power to the DC power supply (FIG. 2), and signaling to the auto reset watchdog circuit (FIG. 3) and the timer circuit (FIG. 4). The auto reset watchdog circuit monitors the AC signal, and upon interruption or flicker, sends a reset signal to the timer circuit. The timer circuit controls a control relay (S1), which in turn controls the 120 Vac power to the load. When the reset signal is received, the AC power to the load is removed, protecting the load. After a set time interval, after the AC power is back to normal, the AC power is automatically reconnected to the load.

10 Claims, 4 Drawing Sheets

FLICKER PROTECTION CIRCUIT

CROSS-REFERENCE TO RELATED APPLICATIONS

This application is entitled to the benefit of Provisional Patent Application Ser. No. 60/120,398, filed Feb. 17, 1999.

STATEMENT REGARDING FEDERALLY SPONSORED RESEARCH AND DEVELOPMENT

Not Applicable

BACKGROUND—FIELD OF INVENTION

This invention is an electronic device which can be plugged into electrical power mains and protects electronic equipment from power main flicker.

BACKGROUND OF THE INVENTION

The rapid proliferation of microprocessor and integrated circuit based electronic home/office equipment (such as, computers, answering machines, stereos, etc.) has created a need to protect this equipment from AC power line problems. These devices are susceptible to flicker on the 120 Vac power line. Flicker, as used here means, the rapid turning off and on of the AC power, due to external power outages or other interruptions or problems on the AC power line. For example, there are some devices that utilize microprocessor controlled flash memory. A brief list of these devices are: answering machines, laser printers, copiers, FAX machines, cable TV decoders, personal computers, medical equipment, stereo equipment, etc. This flash memory allows the device to be free of battery back-up; since the flash memory is designed to automatically save its contents during a power failure. The flicker on the AC power line can cause the microprocessor to malfunction, which in turn causes it to wipe out anything in the flash memory. Non-microprocessor controlled flash memory, has also been known to be wiped out under these conditions. Speech synthesizer chips and other integrated circuit components have been irreparably damaged by flicker as well. Unfortunately, a large amount, if not all, equipment in the field today has no flicker protection circuitry.

The prior art mainly consists of surge protectors and EMI/RFI interference filters. These surge protectors suppress power line voltage "spikes" or transient surges on the AC power line. As a consequence, a market has developed for these power line conditioning apparatuses, which can be inserted between the user's equipment and the power outlet where the equipment is normally plugged in. A popular type of low cost surge suppressor incorporates surge suppression devices in a power outlet strip with multiple sockets. In this way, a single wall outlet can be used to supply power to a number of devices. Unfortunately, the surge protector and the EMI/RFI filters do absolutely nothing to protect against flicker.

Until now, the only way to protect equipment against flicker is to utilize a UPS (Uninterruptible Power Supply) system. As good as UPS is, it is expensive. It makes little sense for example, to pay $100 for UPS, to protect a $30 answering machine. The size and weight of a UPS system is also a draw back and makes its portability impractical. Furthermore, after the UPS uses up its battery supply, it becomes useless in protecting against flicker.

It would be extremely useful, therefore, to provide flicker protection, by a simple, relatively inexpensive, automatic means for insuring the shutting off of power to the user's equipment, in the event that flicker occurs on the AC power line. As well as, restoring AC power to the user's equipment, after flicker has ceased and normal AC power has been restored.

SUMMARY

In accordance with the present invention, the flicker protection circuit provides protection to electronic equipment, from power main flicker, due to power outages, interruptions or other problems on the power mains. The flicker protection circuit does this by safely removing power from the user's electronic equipment and then restoring power after normal AC power has returned to the power mains.

Objects and Advantages

Accordingly, several objects and advantages of this invention are:
(a) unlike surge protectors, the flicker protection circuit can protect electronic equipment from flicker on the power mains;
(b) less expensive than UPS;
(c) more portable (lighter) than UPS;
(d) smaller more convenient size than UPS;
(e) less complex and more reliable than UPS;
(f) may provide effective protection against large electromagnetic pulses or bursts;
(g) can incorporate surge, EMI/RFI and cable/telephone line protection;
(h) can be incorporated in numerous housing styles and configurations.

Further objects and advantages of this invention will become apparent from a consideration of the drawings and ensuing description.

DRAWING FIGURES

Figure 1:
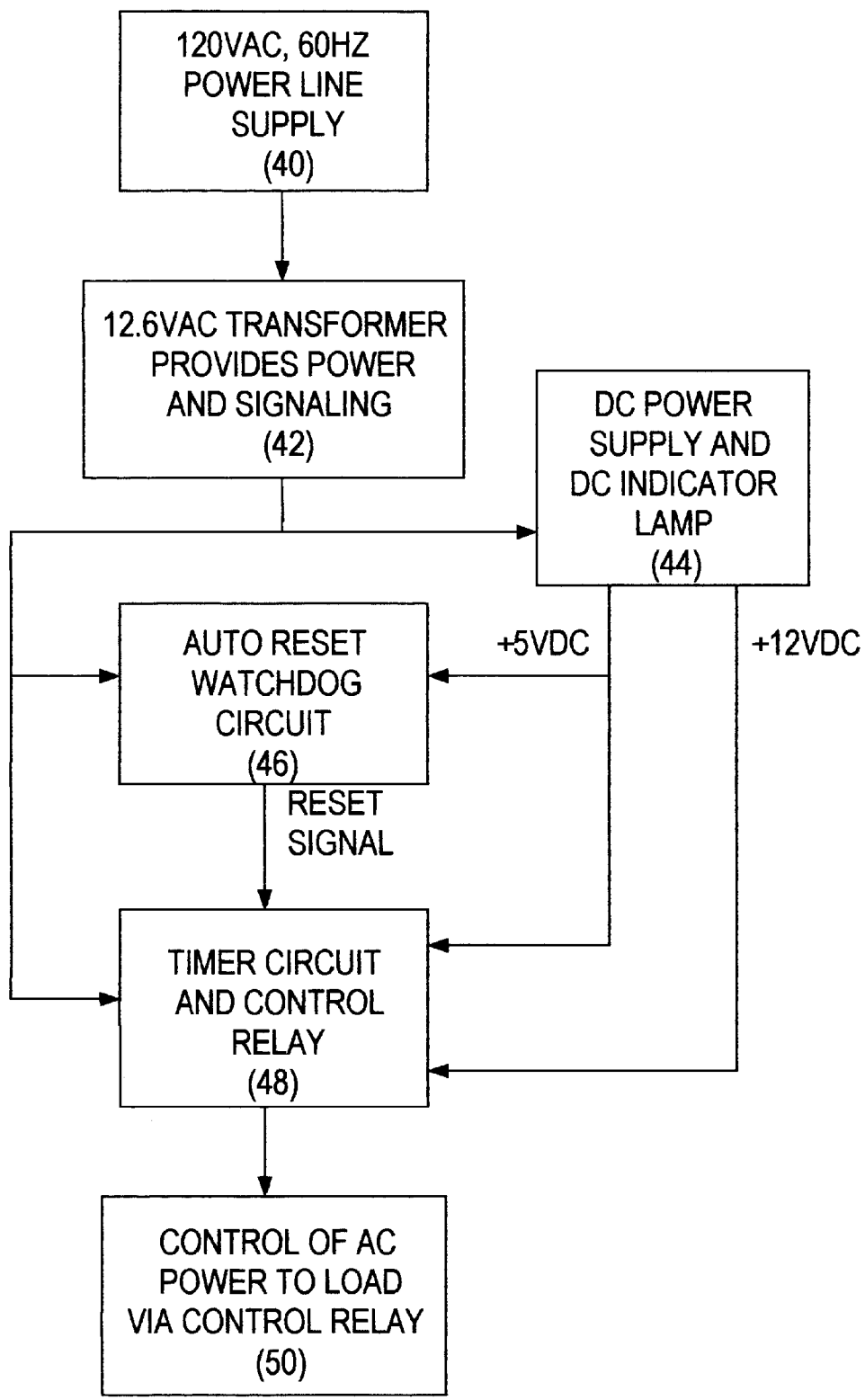
FIG. 1 shows a general flow diagram of power and signaling in the flicker protection circuit.

REFERENCE NUMERALS IN DRAWINGS 20, 22 control relay contact connections
24, 26, 28 green or neutral earth ground line
L1 black or high power line
40–50 FIG. 1 flow diagram numbering
30 three-prong wall plug
32, 34 outlet receptacle(s) or socket(s)
L2 white or return power line

| Resistors (5% Tolerance) | Capacitors |
|---|---|
| R1-1.8k, 1/4W | C1-2200 uF, 25 V |
| R2, R8-1k, 1/4W | C2-0.33 uF, 10% or better tolerance |
| R3, R7, R9, R11-51k, 1/4W | C3-3.3 uF, 10% or better tolerance |
| R4, R10, R12-100Ω, 1/2W | C4, C8-0.01 uF |
| R5-14k, 1/4W (13k + 1k) | C5, C6, C7-0.01 uF, Ceramic |
| R6-2.4k, 1/4W | C9-0.01 uF, 500 WVDC, Ceramic |
| R13-100Ω, 1/4W | |

Integrated Circuits

U1, U4—276-1161, 200V, 1A, Silicon Bridge Rectifier
U2—7805, +5 Vdc, 1A, Voltage Regulator
U3—7812, +12 Vdc, 1A, Voltage Regulator
U5, U7—MOC3010, Triac Output Optoisolator
U6—555 Monolithic Timer
U8—4040B, CMOS 12-Stage Binary Ripple Counter
U9—4081B, CMOS Quad 2-Input AND
U10—4001, CMOS Quad 2-Input NOR
U11—MCT210, NPN Transistor Output Optoisolator w/ DC Current Transfer Ratio of 100%

Transistors

Q1, Q2, Q3—2N2222, NPN General Purpose

Miscellaneous Components

T1—273-1385, Power Transformer, 120 Vac, 60Hz Primary, 12.6 Vac, 300mA Secondary
M1—130L20, 130 Vac MOV, Metal Oxide Varistor
F1—10A, Fast Blow Fuse
D1—276-310, Red Diffused, 2.1 Vdc, 2mA, LED
B1—120 Vac, Neon Lamp
S1—275-248, SPDT Miniature PC Relay, 12 Vdc coil, 120 Vac, 10A contacts, 4000 cycles/second

DESCRIPTION

General Flow Diagram—FIG. 1

The 120 Vac power line 40 normally supplies power to the user's equipment. The user's equipment (devices), for convenience, shall hereafter be known as the load. The flicker protection circuit (for convenience, shall hereafter be known as FPC) is connected between the 120 Vac power line and the load, in order to protect the load. In the FPC a transformer 42, provides power to the DC power supply 44, and signaling to the auto reset watchdog circuit 46 and the timer circuit 48. The auto reset watchdog circuit, for convenience, shall hereafter be known as ARWC. The auto reset watchdog circuit (ARWC) monitors the AC signal, and upon interruption or flicker, sends a reset signal to the timer circuit. The timer circuit controls a control relay 48, which in turn controls the 120 Vac power to the load 50. When the reset signal is received, the AC power to the load is removed, protecting the load. After a set time interval, when the AC power is back to normal, the AC power is automatically reconnected to the load.

General Operation and Timing

The FPC plugs into a standard 120 Vac, 60 Hz power outlet. The devices to be protected (load), are in turn, plugged into the FPC. Whenever the 120 Vac power is applied (at start up or after power interruption, or flicker) to the FPC, there is a 10 second delay, before the FPC connects or supplies 120 Vac power to the load. If there is any flicker, during this 10 second delay, the flicker is prevented from reaching the load, thus allowing the load to be protected. Furthermore, any flicker during this 10 second delay, will cause the 10 second delay timer to reset, causing the 10 second delay to start timing again, after the occurrence of the last flicker. (Here one occurrence of flicker is power going from on to off, and back to the on state.) Thus, the FPC will supply power to the load, only after 10 seconds, after the last flicker, that is, after 10 seconds of a perfect 60Hz sine wave has occurred.

Figure 2:
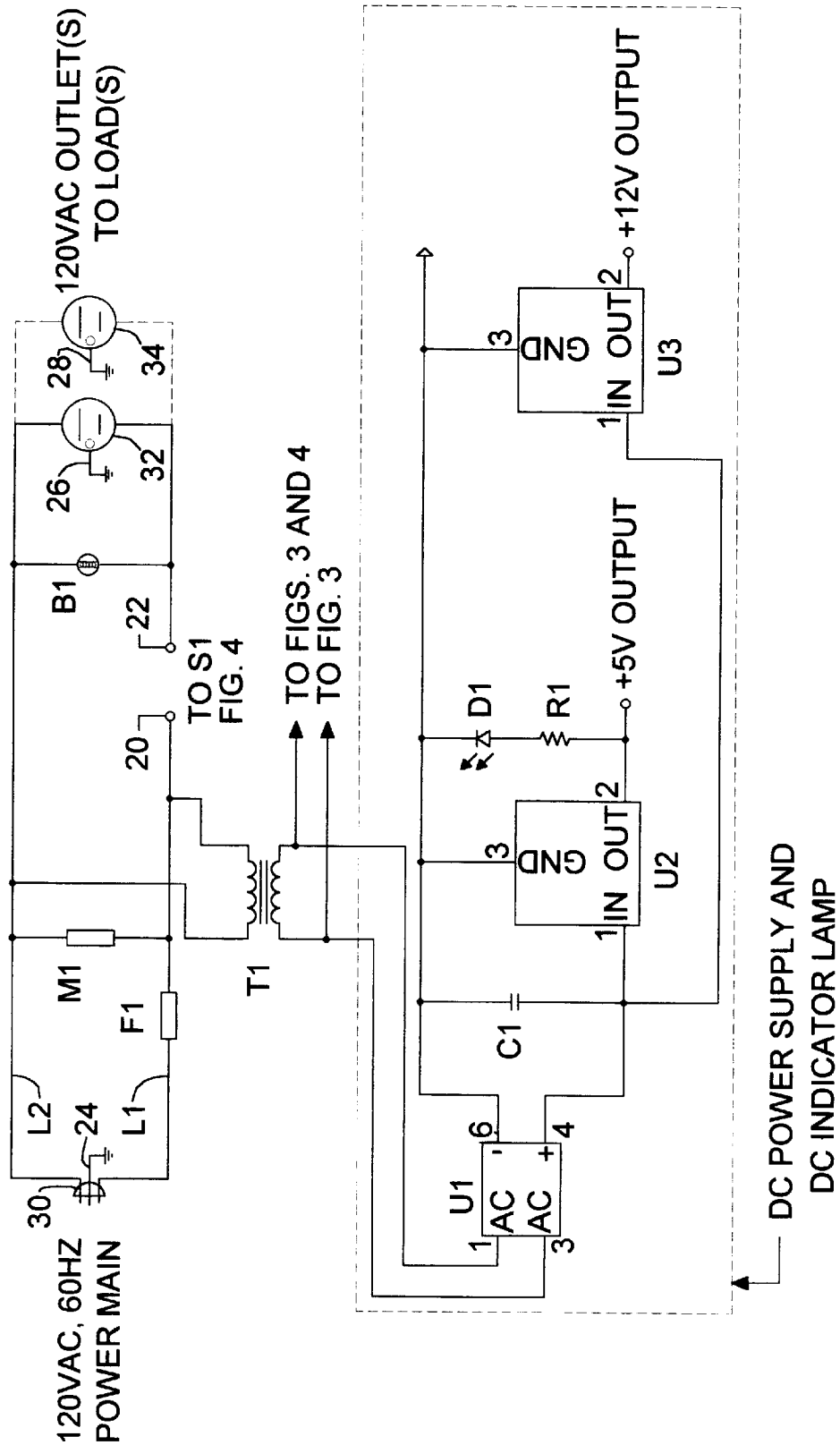
FIG. 2 shows the AC and DC power supply and indicator lamp circuits.

AC Power and AC Indicator Lamp—FIG. 2

The FPC is designed to be plugged into wall mains, by means of a conventional wall plug 30. The power supplied through the input wall plug 30, delivers power and signaling to the FPC circuitry, as well as, output power to a parallel connected outlet receptacles 32, 34, etc. The power transfer between the input wall plug 30, and an FPC transformer T1 is achieved by power transfer along a "black" or "high" line L1, through a series fuse F1, and a "white" or "return" line L2. The power transfer between the input wall plug 30, and the outlet receptacles 32, 34 is achieved by power transfer along the "high" line L1, through the series fuse F1, and a control relay contact connections 20, 22 (FIGS. 2, 4), and the "return" line L2. Plug 30 and outlet receptacles 32, 34 are preferably of the three-prong grounding variety, being coupled through ground terminals by a "green" or "neutral" earth ground lines 24, 26, 28.

The FPC contains some internal protection, which protects itself, as well as, the external device (load) that is plugged into it. The fast blow fuse F1 provides protection against a short-circuit, which wiring and components may not be able to handle. Thus providing protection against a potential fire hazard. A MOV (metal oxide varistor) M1 provides limited surge protection for both the FPC and external load. Multiple MOVs (not shown) can be used to increase surge protection and additional protection can be added as desired. In addition to the circuit protection, an AC power indicator lamp B1, is provided to give a visual indication that AC power is being supplied to the external load. The AC power indicator lamp B1 is a neon bulb, but could be an LED or other indicator. This AC power indicator lamp B1 is the preferred embodiment but is optional.

DC Power Supply and DC Indicator Lamp—FIG. 2

Figure 4:
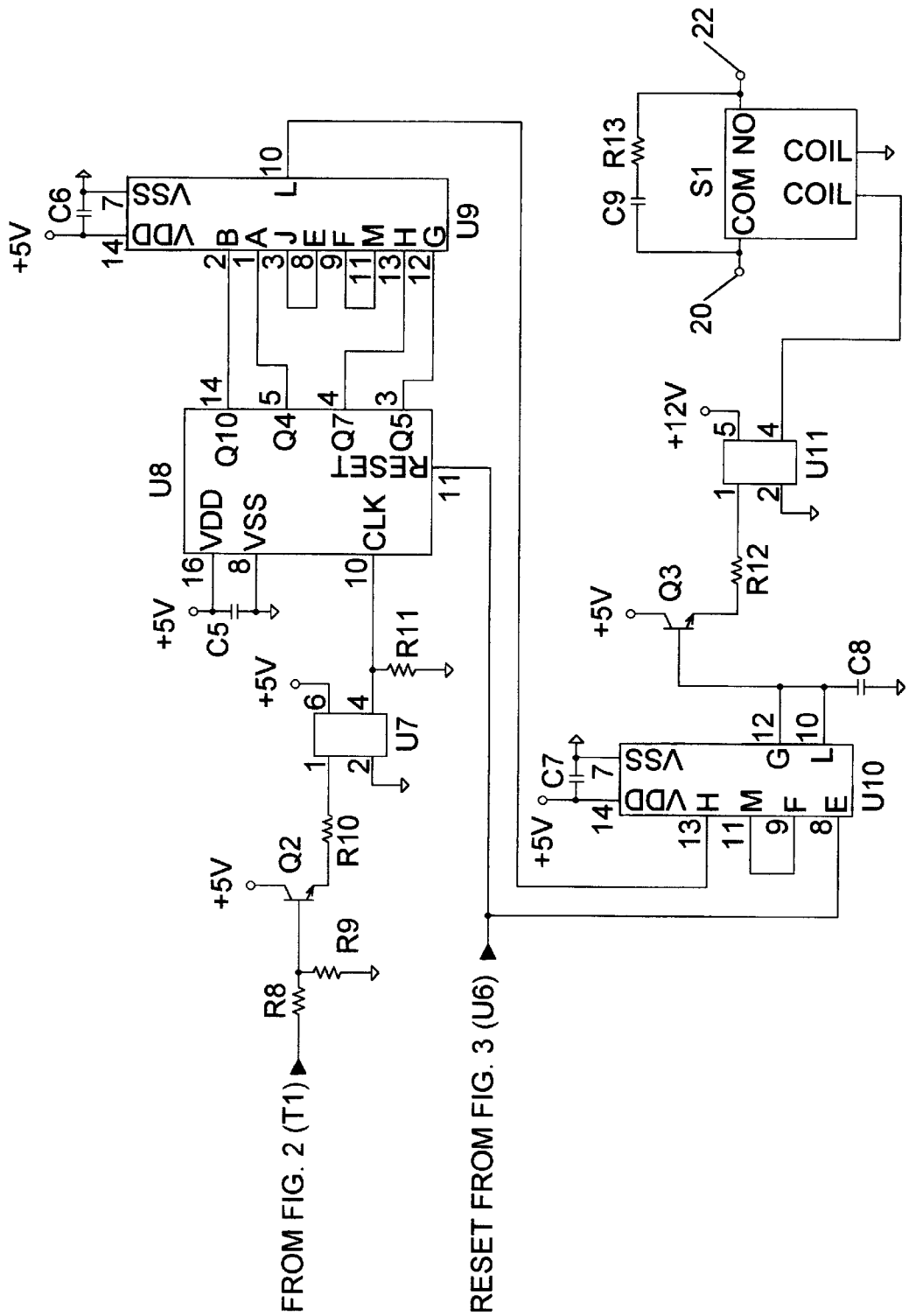
FIG. 4 shows the control relay, timer circuit, and inductive bounce filter.

The DC power supply circuit portion uses the step down transformer T1, to convert 120 Vac from the primary to supply 12.6 Vac from the secondary. The 12.6 Vac signal is then rectified with a full wave silicon bridge rectifier U1. The rectified signal is then filter by a capacitor C1, to greatly reduce ripple and to create an unregulated DC signal. The unregulated DC signal is then used by a +5 Vdc voltage regulator U2, to provide a regulated +5 Vdc voltage, to power the FPC circuitry. The unregulated DC signal is also used by a +12 Vdc voltage regulator U3, to provide a regulated +12 Vdc voltage, to power a control relay S1 (FIG. 4). An alternative embodiment is to use one DC power supply. For example, if all FPC circuitry devices can utilize +12 Vdc, than it is possible to eliminate the +5 Vdc power supply with the proper circuit biasing adjustments. In addition to the DC power supply, a DC power indicator lamp D1, is provided to give a visual indication that DC power is being supplied to the FPC circuitry (in this case +5 Vdc power). The DC power indicator lamp D1 is an LED, but could be another indicator. A resistor R1 provides biasing for the DC power indicator lamp D1. The DC power indicator lamp D1 is the preferred embodiment but is optional.

Figure 3:
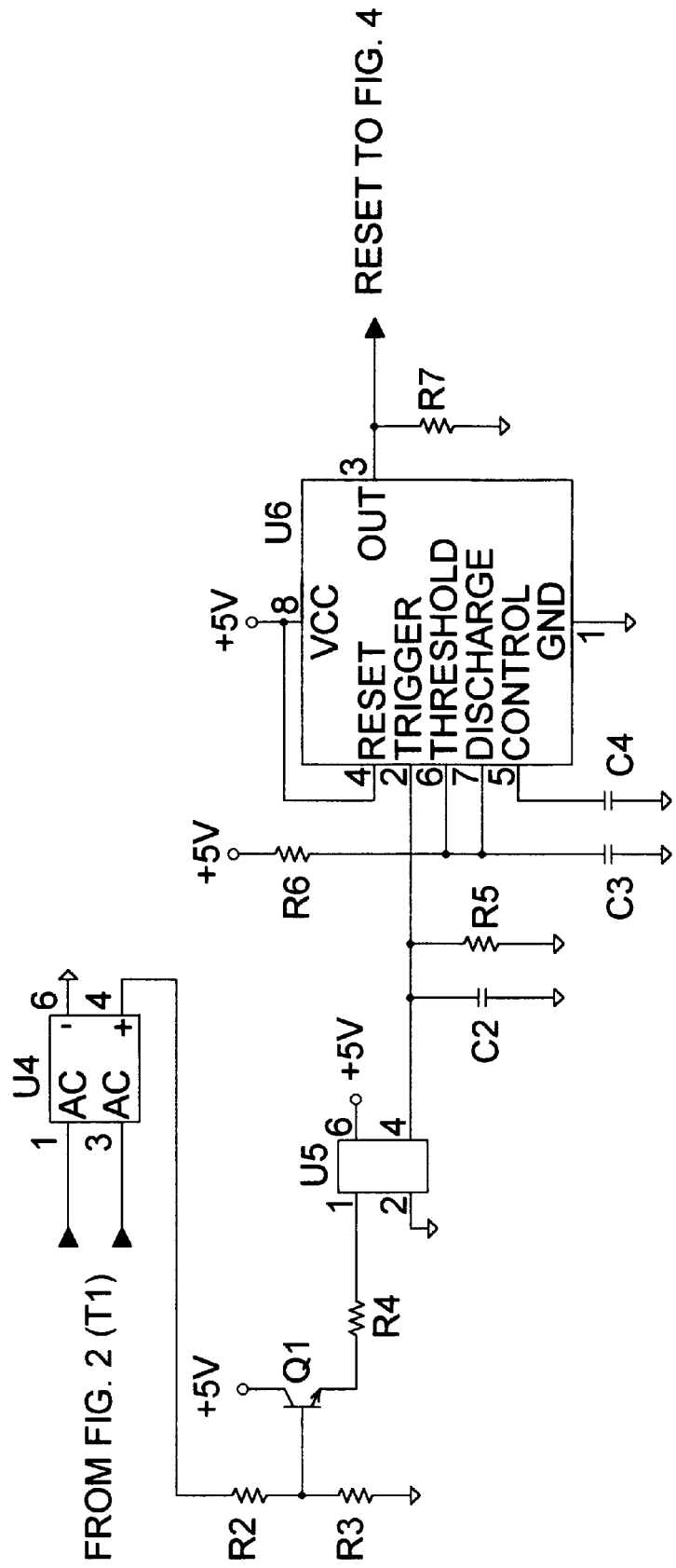
FIG. 3 shows the auto reset watchdog circuit.

Auto Reset Watchdog Circuit—FIG. 3

The auto reset watchdog circuit (ARWC) monitors the incoming 120 Vac power line sine wave signal for a missing half cycle or more, indicative of flicker or other power interruption problems. When a half cycle or more is missing, the ARWC sends out a reset signal that resets the 10 second timer, and also turns off the AC power to the load. As indicated, the ARWC is designed to have a half cycle accuracy, that is, if approximately 5 ms of the sinusoid wave is missing (either the positive or negative half of the sine wave), the ARWC sends out the reset signal. The word approximately is used, because the accuracy is dependent upon the tolerance of the RC timing elements.

The ARWC monitors the 12 Vac power line sine wave signal by looking at the signal as follows. The transformer T1 can be used to monitor the signal, since the secondary signal follows the primary signal exactly. The secondary signal is then fully rectified with a silicon bridge rectifier U4. This rectified signal still completely represents the original 120 Vac signal and can be further converted to +5 V pulses that can be more easily monitored. A resistor R2 provides both biasing for a transistor Q1, as well as, wave shaping. The resistor R2 wave shapes by limiting the voltage swing to around +6 V. A pull down resistor R3 is needed to assure that this wave shape, now looking more like a pulse, will reach 0 V between the pulses. The transistor Q1 provides additional wave shaping, by sharpening up the pulse and limiting its magnitude to +5 V. The transistor Q1 also supplies sufficient current to drive an optoisolator U5. A resistor R4 is the biasing for the optoisolator U5. The optoisolator U5 finishes the wave shaping, by making excellent shaped pulses, approximately +5 V in amplitude. The optoisolator U5, also isolates the analog portion of the circuit, from the pulses.

The signaling pulses exiting the optoisolator U5 are subjected to an RC time constant before entering a 555 timer U6. This RC time constant is the one used to determine if there is a missing half cycle or more, and than activates the 555 timer to transmit the reset pulse. The RC time constant consists of a resistor R5 and a capacitor C2 and are valued to create a time constant of about 5 ms, which is about half of the pulse width. For clarity, one cycle of a 60 Hz signal is 16.667 ms in duration. So a half cycle is 8.333 ms in duration. Therefore, one pulse occurs every 8.333 ms. If there is a missing 5 ms of a pulse, the previous pulse decays and when it hits the value of ⅓ of +5 V (at approximately 5 ms) the 555 timer U6 is triggered. When the 555 timer U6 is triggered, it generates a reset pulse with a width determined by another RC time constant. The reset pulse width is determined from a resistor R6 and a capacitor C3 and are valued to create a pulse width of about 8.7 ms or about the width of the signaling pulses. If there are no missing pulse or pulses, than the pulse never has a chance to decay to the point of triggering the 555 timer U6. Thus, if there are no missing pulses, or in other words, a perfect sinusoidal signal is present, then no reset pulse is generated. A capacitor C4 is a bypass capacitor for noise immunity. A resistor R7 is another pull down resistor.

Timer Circuit—FIG. 4

The timer circuit does the 10 second delay timing. After the 10 second delay, the timer circuit activates the control relay S1 which supplies 120 Vac to the load. This is of course assuming, that no reset, due to power interruption (flicker, etc.), has occurred and therefore, a perfect sine wave was received during the 10 second delay. It should be noted, that the 10 second delay can be changed to another value. The author has concluded from trial tests, that a 10 second delay is more than adequate and therefore the preferred embodiment. But an alternate embodiment, such as a production version might want to go with a 60 second delay, for example, or a selectable delay, say 10, 30 and 60 seconds.

The timer circuit draws its timing signal from the transformer T1 secondary. By tapping into one output of the secondary, the timing signal becomes a half wave rectified signal when compared to ground. This is because ground is determined by the silicon bridge rectifiers (U1 and U4 in FIGS. 2 and 3 respectively) and this ground is common throughout the FPC circuit. Since digital circuits will be doing the timing by counting pulses, we need to wave shape, the half wave rectified sine wave, into +5 V pulses. This process is identical to the ARWC circuit.

A resistor R8 provides both biasing for a transistor Q2, as well as, wave shaping. The resistor wave shapes by limiting the voltage swing to around +6 V. As with the ARWC circuit, a resistor R9 is a pull down resistor. The transistor Q2 provides additional wave shaping, by sharpening up the pulse and limiting its magnitude to +5 V. The transistor Q2 also supplies sufficient current to drive an optoisolator U7. A resistor R10 is the biasing for the optoisolator U7. The optoisolator U7 and a pull down resistor R11 finishes the wave shaping, by making excellent shaped pulses, approximately +5 V in amplitude. The optoisolator U7, also isolates the analog portion of the circuit from the pulses.

The timing pulses, exiting the optoisolator U7, go to a 12-stage binary ripple counter U8 and the counter counts each pulse. Since the pulses are derived from a 60 Hz half wave rectified signal, the pulses have a propagation rate that will be exactly 60 pulses per second. Knowing this, pin outs from the counter can be selected, that have a total count of 600 (600 pulses) or exactly a 10 second time duration. Pin 14 has a count of 512, pin 4 has a count of 64, pin 3 has a count of 16, and pin 5 has a count of 8. These four pins total 600 and when all four pins go high, than a count of 600 has been reached (a 10 second delay). A capacitor C5 is a CMOS IC power-ground noise filter capacitor for the counter U8. Pin 11 is the reset, and resets the counter to 0 when the ARWC sends the reset signal or when power is removed.

To determine when all four pins (pins 14, 5, 4, and 3) are high, the signals from these four pins of the counter U8 are AND together, using a quad 2-input AND U9. The output of the AND U9, pin 10, will stay high for a minimum of one pulse period. This is because the counter U8 is constantly counting pulses, and eventually one of the pins will go low. When one of the pins go low, the AND U9 output, pin 10, will go low. A capacitor C6 is a CMOS IC power-ground noise filter capacitor for AND U9.

Once the 10 second time delay has passed, the control relay S1 needs to turn on, and remain on, unless the ARWC sends a reset. So a time limited pulse from the AND U9 output, pin 10, indicating 600 pulses or 10 second delay, needs to be latched high. To perform this function, a quad 2-input NOR U10 is connected in an RS Flip Flop configuration. The output of AND U9, pin 10, is fed into the "set" pin, pin 13, of the RS Flip Flop, NOR U10. Pin 8 is the "reset" pin of the RS Flip Flop, NOR U10, and the output, pin 10, is reset to low when the ARWC sends the reset signal or when power is removed. So the output pin 10, of the RS Flip Flop, NOR U10, will be latched high when receiving a pulse on the "set" pin or latched low when receiving a pulse on the "reset" pin. When the RS Flip Flop, NOR U10, is latched low, this will have the effect of turning off the control relay S1, which in turn disconnects power to the load. It was found during power up, that the RS Flip Flop, NOR U10, would get confused and latch high. This is due to the internal feedback race condition, and is solved by putting a capacitor C8 on the output pin 10, of the RS Flip Flop, NOR U10. A capacitor C7 is a CMOS IC power-ground noise filter capacitor for the NOR U10.

Control Relay—FIG. 4

Since the control relay S1 needs +12 Vdc to operate, the +5 Vdc signal coming from the RS Flip Flop, NOR U10, can not drive the relay and will need to be converted. The output signal from pin 10 of the RS Flip Flop, NOR U10, drives a transistor Q3. Since the signal driving the transistor is coming from a CMOS device, no transistor biasing is needed. The transistor Q3 is used to supply sufficient drive current for an optoisolator U11. A resistor R12 is the biasing for the optoisolator U11. This optoisolator U11, needs to be an NPN transistor output type with a DC current transfer ratio of at least 100%. An alternative embodiment would be to use an optoisolator with an NPN Darlington pair output, which should work as well. A triac output optoisolator has a tendency to latch and should not be used. The optoisolator U11, is used to provide the +12 Vdc power to the control relay S1, as well as, isolating the +12 Vdc and +5 Vdc power supplies. Therefore the +12 Vdc power is connected to pin 5 and is supplied to the control relay S1 through pin 4, the emitter side of the optoisolator U11.

The control relay S1, is the control for the 120 Vac power to the load. It allows control of the 120 Vac power via the +12 Vdc and +5 Vdc FPC circuitry. The common and normally open contacts of the control relay S1, are the ones used to connect the 120 Vac power to the load. The connections 20 and 22, in FIGS. 2 and 4, show where the control relay S1 is connected into the AC power circuit.

Note, as an alternative embodiment, a triac could be used in place of the control relay S1. Proper biasing and circuit elements are needed, as well as, very good noise immunity circuitry. The relay is the preferred embodiment, since triacs can be falsely triggered by voltage surges or anomalies on the 120 Vac power line.

Inductive Bounce Filter—FIG. 4

It was found during testing, that when the control relay S1 was energized, and the 120 Vac contacts closed to provide power to an "inductive" load (i.e. transformer), that an inductive voltage bounce would occur. This inductive bounce would corrupt the 60 Hz sine wave long enough to cause the ARWC to falsely trigger, roughly half of the time, resulting in the power being turned off to the load. The preferred embodiment to correct for this problem, is to add an inductive bounce filter across the 120 Vac, relay contacts. This filter consist of a resistor R13 and a capacitor C9 in series across the 120 Vac, relay contacts and effectively eliminates the inductive bounce problem. The draw back to the filter is that when the relay is off, that is no AC power to the load, the filter provides an AC electrical path, causing the AC power indicator lamp B1 to light, if no load is connected to the FPC. This false indication of AC power is more of an annoyance and goes away if a load is plugged into the FPC. The filter only allows current in the microamp range to pass through, but is enough to light the AC power indicator lamp B1. Adding a load, draws most of the small current away from the AC power indicator lamp B1, preventing it from falsely lighting. The advantage in arranging the filter this way, is that it is only in the circuit (electrical path), in series with the load, during the 10 second delay, while the relay is off. So it draws a very small amount of power for only 10 seconds. When the relay turns on, the filter is essentially shorted out (bypassed) and no longer contributes to the circuit.

An alternative embodiment would be to locate this filter across the load, at the outlet receptacle 32, 34 of the FPC. The advantage in this is that the AC power indicator lamp B1 would not falsely light. The disadvantage, and the reason for not doing it this way, is that the filter will be in the circuit all the time, in parallel with the load, while the relay is on, except during the 10 second delay, when the relay is off. So the filter will be drawing power most of the time, as well as, causing a filtering effect across the load. Granted these affects are small, but can be avoided with the original configuration.

CONCLUSION, RAMIFICATIONS, AND SCOPE

Thus, the present invention achieves the desired objective, namely providing system shut down upon AC power line flicker, and automatic start up after normal AC power has been restored.

The advantage of FPC over UPS is that it is relatively simple and inexpensive. It is relatively small and light, and therefore more portable. The UPS becomes useless in protecting against flicker when its battery supply runs out; the FPC on the other hand doesn't have this problem. The FPC may also protect against large electro-magnetic pulses or bursts, by removing power to the connected equipment. Therefore, the FPC is recommended for all devices with memory and integrated circuit chips.

The FPC may be incorporated into a flexible cord set, having a multiple outlet strip at the end, or may be an integral part of an enclosure that houses outlet socket(s) and plugs directly into a wall outlet. In addition, the FPC may incorporate surge and EMI/RFI protection, as well as, telephone line and cable protection.

While the invention has been described with reference to a preferred embodiment, it will be understood by those skilled in the art, that various changes may be made and equivalents may be substituted for elements thereof, without departing from the scope of the invention. In addition, many modifications may be made to adapt a particular situation or material to the teachings of the invention without departing from the essential scope thereof For example, modifications may be made to make the invention usable for foreign country power systems without departing from the essential scope thereof. Thereof, it is intended that the broad aspect of the invention not be limited to a particular embodiment disclosed as the best mode contemplated for carrying out the invention, but that the invention will include all embodiments falling within the scope of the implied claims and their legal equivalents.

What is claimed is:

1. A flicker protection circuit for protecting electronic equipment from alternating current power main flicker, comprising:

(a) a voltage step down device means for providing power to a direct current power supply means and for providing signaling to an auto reset watchdog circuit means and a timing circuit means, (b) said direct current power supply means for supplying power to circuit components of said auto reset watchdog circuit means and said timing circuit means, (c) said auto reset watchdog circuit means for monitoring alternating current power and for sending a reset signal to said timing circuit means if said alternating current power flickers, (d) said timing circuit means for providing predetermined timing delay after receiving said reset signal, before said timing circuit means will activate a control device means, (e) said control device means for applying and removing said alternating current power to said electronic equipment, (f) a wave shaping circuit means for increased accuracy of monitoring alternating current power flicker, (g) a integrated digital circuit means for increased accuracy and larger flexibility of the timing delay, (h) a inductive bounce filter means wherein an inductive voltage spike could be suppressed, eliminating false triggering of the auto reset watchdog circuit means, whereby said flicker protection circuit will remove said alternating current power to said electronic equipment if said flicker occurs and, restore said alternating current power to said electronic equipment when said flicker has stopped and said alternating current power is normal, protecting said electronic equipment.

2. The flicker protection circuit of claim 1 wherein said voltage step down device means is a transformer.

3. The flicker protection circuit of claim 1 wherein said direct current power supply means is an electronic circuit to convert alternating current to direct current at predetermined voltages heretofore supplying power to circuit components.

4. The flicker protection circuit of claim 1 wherein said auto reset watchdog circuit means is an electronic circuit consisting of electronic components.

5. The flicker protection circuit of claim 1 wherein said timing circuit means is an electronic circuit consisting of electronic components.

6. The flicker protection circuit of claim 1 wherein said control device means is a relay.

7. The flicker protection circuit of claim 1, wherein the auto reset watchdog circuit means further comprising wave shaping circuit means comprises, three resistors, a transistor, and a triac output optoisolator.

8. The flicker protection circuit of claim 1, wherein the timing circuit means further comprising integrated digital circuit means comprises, 12-stage binary ripple counter and quad 2-input AND gates.

9. The flicker protection circuit of claim 1, further comprising an inductive bounce filter means comprises, a series resistor and capacitor.

10. A method for protecting electronic equipment from alternating current power main flicker comprising:

(a) providing a voltage step down device means for providing power to a direct current power supply means and for providing signaling to an auto reset watchdog circuit means and a timing circuit means, (b) providing said direct current power supply means for supplying power to circuit components of said auto reset watchdog circuit means and said timing circuit means, (c) providing said auto reset watchdog circuit means for monitoring alternating current power and for sending a reset signal to said timing circuit means if said alternating current power flickers, (d) providing said timing circuit means for providing predetermined timing delay after receiving said reset signal, before said timing circuit means will activate a control device means, (e) providing said control device means for applying and removing said alternating current power to said electronic equipment, (f) a wave shaping circuit means for increased accuracy of monitoring alternating current power flicker, (g) a integrated digital circuit means for increased accuracy and larger flexibility of the timing delay, (h) a inductive bounce filter means wherein an inductive voltage spike could be suppressed, eliminating false triggering of the auto reset watchdog circuit means, whereby said method will result in removing said alternating current power to said electronic equipment if said flicker occurs and, restoring said alternating current power to said electronic equipment when said flicker has stopped and said alternating current power is normal, protecting said electronic equipment.

\* \* \* \* \*